(12) United States Patent
Inoue (10) Patent No.: US 10,147,985 B2
(45) Date of Patent: Dec. 4, 2018

(54) BATTERY PACK

(71) Applicant: DENSO CORPORATION, Kariya, Aichi-pref. (JP)

(72) Inventor: Yoshimitsu Inoue, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/554,955

(22) PCT Filed: Jul. 1, 2016

(86) PCT No.: PCT/JP2016/069587
§ 371 (c)(1),
(2) Date: Aug. 31, 2017

(87) PCT Pub. No.: WO2017/047205
PCT Pub. Date: Mar. 23, 2017

(65) Prior Publication Data
US 2018/0040933 A1    Feb. 8, 2018

(30) Foreign Application Priority Data

Sep. 15, 2015 (JP) ................................. 2015-182041

(51) Int. Cl.
*H01M 10/65*    (2014.01)
*H01M 2/10*    (2006.01)
(Continued)

(52) U.S. Cl.
CPC ......... *H01M 10/6557* (2015.04); *H01M 2/08* (2013.01); *H01M 2/10* (2013.01);
(Continued)

(58) Field of Classification Search
CPC ........................ H01M 10/6557; H01M 10/643
See application file for complete search history.

(56) References Cited

U.S. PATENT DOCUMENTS

2004/0069620 A1* 4/2004 Bitsche ................. F28D 9/0062
   204/228.6
2006/0091856 A1* 5/2006 Lee ..................... H01M 2/1077
   320/116

(Continued)

FOREIGN PATENT DOCUMENTS

JP    2009-170370 A    7/2009
JP    2014-203600 A    10/2014

*Primary Examiner* — Matthew J Merkling
(74) *Attorney, Agent, or Firm* — Oliff PLC (57) ABSTRACT

An inner case affixes single cells and has multiple individual storage chambers. A fluid drive device draws a fluid after passing through the individual storage chambers to form a circulation flow. A beam supports the inner case from the lower side. The inner case has an inlet port into which the fluid flows and an outlet port through which the fluid flows out. A downstream chamber, which communicates with the outlet port, is formed in an interior of the inner case between the individual storage chambers that face each other at a distance. The downstream side chamber is connected to a lower wall side passage partitioned by the beams. The fluid flowing out from the outlet port to the downstream side chamber passes through the lower wall side passage and is drawn into an intake port of the fluid drive device.

4 Claims, 2 Drawing Sheets

(51) Int. Cl.

| | | |
|---|---|---|
| *H01M 10/62* | (2014.01) | |
| *H01M 10/64* | (2014.01) | |
| *H01M 10/61* | (2014.01) | |
| *H01M 2/08* | (2006.01) | |
| *H01M 10/6557* | (2014.01) | |
| *H01M 10/625* | (2014.01) | |
| *H01M 10/6563* | (2014.01) | |
| *H01M 10/6568* | (2014.01) | |
| *H01M 10/6551* | (2014.01) | |
| *H01M 10/643* | (2014.01) | |
| *H01M 10/6554* | (2014.01) | |
| *H01M 10/617* | (2014.01) | |
| *H01M 10/6565* | (2014.01) | |
| *H01M 10/613* | (2014.01) | |
| *H01M 10/615* | (2014.01) | |

(52) U.S. Cl.
CPC ....... *H01M 2/1077* (2013.01); *H01M 10/613* (2015.04); *H01M 10/615* (2015.04); *H01M 10/617* (2015.04); *H01M 10/625* (2015.04); *H01M 10/643* (2015.04); *H01M 10/6551* (2015.04); *H01M 10/6554* (2015.04); *H01M 10/6563* (2015.04); *H01M 10/6565* (2015.04); *H01M 10/6568* (2015.04); *H01M 2220/20* (2013.01)

(56) References Cited

U.S. PATENT DOCUMENTS

| | | | |
|---|---|---|---|
| 2010/0061061 A1* | 3/2010 | Murata | H01M 2/1077 361/699 |
| 2010/0119929 A1* | 5/2010 | Gaben | H01M 2/1077 429/120 |
| 2010/0151308 A1* | 6/2010 | Hermann | H01M 2/1077 429/120 |
| 2012/0156541 A1* | 6/2012 | Sohn | H01M 10/0525 429/120 |
| 2013/0004820 A1* | 1/2013 | Tennessen | H01M 10/625 429/120 |
| 2014/0154545 A1* | 6/2014 | Kishii | H01M 2/1077 429/99 |
| 2014/0295224 A1 | 10/2014 | Inoue | |
| 2015/0010802 A1* | 1/2015 | Inoue | H01M 10/486 429/120 |
| 2015/0214584 A1* | 7/2015 | Droste | H01M 2/1077 429/99 |
| 2016/0285142 A1* | 9/2016 | Kimura | H01M 2/1077 |

\* cited by examiner

BATTERY PACK

CROSS REFERENCE TO RELATED APPLICATION

This application is based on Japanese Patent Application No. 2015-182041 filed on Sep. 15, 2015, the disclosure of which is incorporated herein by reference.

TECHNICAL FIELD

The present disclosure relates to a battery pack including multiple single cells that are housed in a case.

BACKGROUND ART

For example, a battery pack disclosed in Patent Literature 1 has been known as a battery pack for housing a single cell. The battery pack of Patent Literature 1 includes a case that houses a cell stack that is an aggregate of multiple cylindrical single cells, and a crossflow fan that is housed in the case and circulates a heat exchange medium present in the case in a laminar flow state. In the battery pack, one cell stack is housed inside the case with both end sides of each single cell supported by a pair of plate-like support members.

The heat exchange medium delivered from the crossflow fan comes in contact with the single cell with a laminar flow width equal to a longitudinal length of each single cell. For that reason, the heat exchange medium comes in contact with all of outer surfaces of the respective single cells and exchanges heat with all of the single cells. Therefore, substantially uniform heat exchange can be performed throughout one cell stack.

PRIOR ART LITERATURES

Patent Literature

PATENT LITERATURE 1: JP-A-2009-170370

However, in the case where the technique disclosed in Patent Literature 1 is applied to a battery pack that houses the multiple cell stacks inside the case, an issue arises where it is difficult that the heat exchange medium circulating in the case is evenly distributed to the single cells of all the cell stacks. Inside the case that houses the multiple cell stacks, portions arise where a flow resistance is as large as a fluid is unlikely to flow, and portions arise where the flow resistance is as small as the fluid is likely to flow. This makes it difficult to form a circulation flow in which the heat exchange medium blown out from the crossflow fan evenly passes through the respective cell stacks and then is drawn into the crossflow fan.

On the other hand, it is conceivable to provide a configuration having a duct for providing a circulation passage through which a heat exchange medium blown out from a crossflow fan passes through each cell stack and is then drawn into the crossflow fan. However, the configuration of this type raise an issue that a duct coupled to a suction portion of the crossflow fan must be provided for all the cell stacks.

SUMMARY OF INVENTION

It is an object of the present disclosure to produce a battery pack which is capable of equalizing the distribution of a cooling fluid to multiple cell stacks and reducing the number of ducts connected to the respective cell stacks.

According to one aspect of the present disclosure, a battery pack comprises a plurality of cell stacks that are battery aggregates formed by connecting a plurality of tubular single cells to each other. The battery pack further comprises an inner case integrated with a support portion fixing the single cells. The inner case has a plurality of individual storage chambers storing the respective cell stacks, individually. The battery pack further comprises a pack case that houses the inner case. The battery pack further comprises a fluid drive device to draw a fluid supplied to an interior of the pack case after the fluid has passed through the individual storage chambers of the inner case. The fluid drive device forms a circulation flow inside the pack case. The battery pack further comprises a plurality of beams integrated with a lower wall of the pack case to support the inner case from a lower side. Each of the individual storage chambers in the inner case includes an inlet port into which the fluid flows from the outside of the inner case, and an outlet port through which the fluid flows out of the individual storage chamber. An interior of the inner case forms a downstream chamber, which communicates with each of the outlet ports, between the individual storage chambers facing each other at a distance. The downstream side chamber is connected to a lower wall side passage partitioned with the beams. The fluid flowing out of each of the outlet ports into the downstream side chamber passes through the lower wall side passage and is drawn into an intake port of the fluid drive device.

BRIEF DESCRIPTION OF THE DRAWINGS

The aforementioned object, other objects, characteristics, and advantages of the present disclosure become more apparent from a description that will be given with reference to the accompanying drawings. The drawings are as follows.

DESCRIPTION OF EMBODIMENTS

First Embodiment

Hereinafter, multiple aspects for implementing the present disclosure will be described with reference to the drawings. In each aspect, the same reference numerals are assigned to portions corresponding to contents described in a preceding aspect, and repetitive description may be omitted. When a portion of a configuration in each aspect is described, other aspects described previously can be applied to other portions of the configuration. Not only portions which are specifically clarified so as to be combined in each embodiment are capable of being combined, but also embodiments are capable of being partially combined with each other even though combination is not clarified as long as no adverse effect is particularly generated with respect to the combination.

First Embodiment

Hereinafter, a battery pack 1 of a first embodiment will be described with reference to FIG. 1. The battery pack 1 is applied to, for example, a hybrid vehicle including, as travel driving sources, a motor, which is driven with an electric power charged in a battery, and an internal combustion engine, an electric vehicle including a motor as the travel driving source, and the like. Each of single cells 121 included in the battery pack 1 is a tubular storage battery, for example, a nickel-hydrogen secondary battery, a lithium ion secondary battery, an organic radical battery, or the like.

A lithium ion secondary battery will be described as an example of the tubular single cell 121 used for the battery pack 1. The single cell 121 disclosed in the present disclosure includes an electrode body having a positive electrode and a negative electrode, and a battery case that accommodates the electrode body and an electrolytic solution. The battery case for accommodating the electrode body is configured with a tubular portion as a case body and a lid. The tubular portion is in a shape capable of accommodating the electrode body, for example, a bottomed tubular shape. The tubular portion has an opening portion at an upper portion, and is formed so as to accommodate the electrode body through the opening portion. The lid is a disk-shaped member that closes the upper end opening portion of the tubular portion. The battery case is preferably made of a metallic material that is lightweight and high in thermal conductivity, such as aluminum, stainless steel, or nickel plated steel.

The lid of the battery case is equipped with safety valves each of which is a gas discharge mechanism for discharging the gas generated in the case to the outside. Each of the safety valves is configured so that a valve body is deformed for safety when a pressure in the battery case rises abnormally and the gas in the case is discharged from a gap formed between the valve body and the lid. Further, positive electrode terminals are provided on the lid. For example, each of the positive electrode terminals protrudes from the lid through a gasket and is electrically connected to a positive electrode of a wound electrode body housed inside of the tubular portion. A negative electrode of the wound electrode body is connected to a lower surface of the tubular portion located on a side opposite to the lid, and a lower portion of the tubular portion configures a negative electrode terminal. Similarly to an electrode body of a typical tubular battery, the electrode body is configured to include, for example, positive and negative electrode active materials, positive and negative electrode current collectors, separators, and the like.

In each cell stack 120 included in the battery pack 1, electrode terminals having a different polarity or the same polarity in the adjacent single cells 121 are electrically connected to each other via conductive members such as busbars 122. The connection between each busbar 122 and the electrode terminals is made by, for example, screwing, welding, or the like. Therefore, total terminal portions, which are provided at both ends of the multiple single cells 121 electrically connected to each other via the busbars 122 or the like, are configured to be supplied with an electric power from the outside or to be discharged to other electric devices.

The battery pack 1 is installed in a pack accommodating space such as a trunk room of a vehicle or a trunk room back area provided below the trunk room. The battery pack accommodating space may be, for example, a place where spare tires, tools and the like can be stored. The battery pack 1 is installed in the battery pack accommodating space in a posture where a lower wall 112 and a lower wall side passage 135 are placed downward.

Further, the battery pack 1 may be installed below a front seat provided in a vehicle interior of the vehicle, below a rear seat, or the like. In this case, the battery pack 1 is installed below the front seat, the rear seat, or the like in the posture that the lower wall 112 and the lower wall side passage 135 are placed downward. In addition, the space in which the battery pack 1 is installed below the rear seat may communicate with the trunk room back area below the trunk room. Further, the installation space can also be configured to communicate with the outside of the vehicle.

The battery pack 1 includes a pack case 110 that has an airtightly sealed internal space isolated from the outside, and multiple inner cases 4 and 104 that are accommodated in the internal space of the pack case 110. In the example shown in FIG. 1, the pack case 110 accommodates two inner cases 4 and one inner case 104. Each of the inner cases 4 and 104 is installed on multiple beams 3, which are integrally provided on the lower wall 112 forming the pack case 110, and is supported from the lower side by the beams 3. A predetermined space is formed between the inner cases 4 and 104, and an upper wall 111, a side wall 113, and a side wall 114 forming the pack case 110, and a fluid supplied from a fluid drive device flows in the space.

Each of the inner cases 4 and 104 is provided with multiple individual storage chambers 40 that individually store the multiple cell stacks. In other words, one cell stack is installed in each of the individual storage chambers 40. Each of the individual storage chambers 40 has an inlet port 40a through which the fluid flows into the individual storage chamber 40 and an outlet port 40b through which the fluid flowing in the individual storage chamber 40 flows out. The multiple individual storage chambers 40 defined in each of the inner cases 4 and 104 are provided so that the fluid flowing out from the outlet ports 40b merges into downstream side chambers 41. Therefore, the multiple individual storage chambers 40 are provided so that the respective outlet ports 40b face the downstream side chambers 41.

For example, each of the downstream side chambers 41 is a space provided between the multiple individual storage chambers 40 provided so as to face each other at a distance. The multiple individual storage chambers 40 provided inside each of the inner cases 4 and 104 may be installed side by side, or the multiple individual storage chambers 40 installed side by side are installed in a vertical direction. When the multiple individual storage chambers 40 installed side by side are aligned in the vertical direction, each of the downstream side chambers 41 provides a space extending in the vertical direction as shown in FIG. 1. Each of the downstream side chambers 41 is connected to the lower wall side passage 135 partitioned between the beam 3 and the beam 3.

Figure 1:
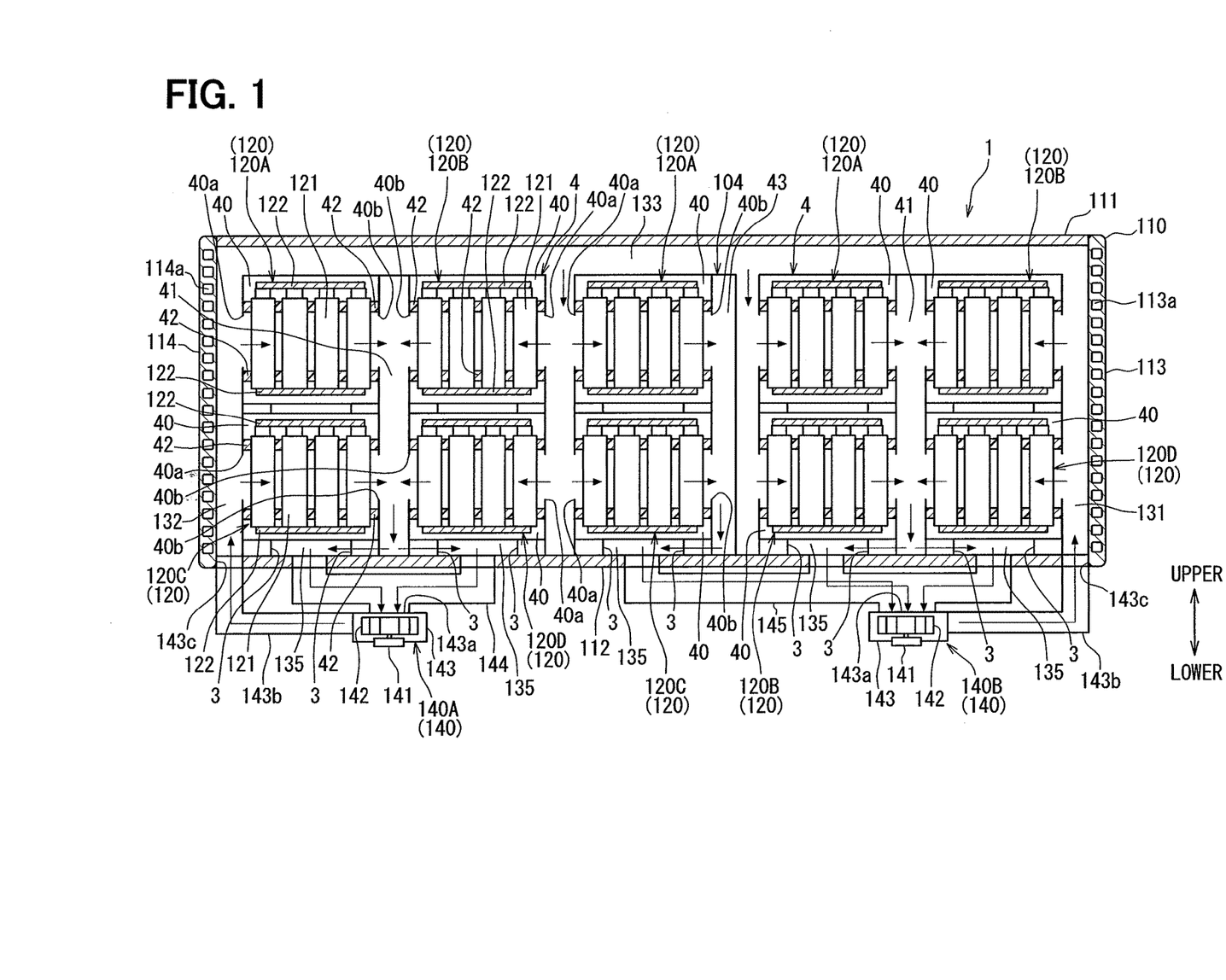
FIG. 1 is a plan view showing a configuration and a fluid flow of a battery pack according to a first embodiment.

In the example shown in FIG. 1, at least four cell stacks 120A, 120B, 120C, and 120D are housed in each of the individual storage chambers 40 in the inner case 4. The cell stack 120A and the cell stack 120B aligned in the horizontal direction and the cell stack 120C and the cell stack 120D aligned in the horizontal direction are arranged in two rows in the vertical direction. The cell stack 120A is installed on the cell stack 120C and the cell stack 120B is installed on the cell stack 120D, and the individual storage chambers 40 of the cell stack 120C and the cell stack 120D are installed and supported on the beams 3.

At least two cell stacks 120A and 120C that are aligned in the vertical direction are housed in the respective individual storage chambers 40 in the inner case 104. Hereinafter, each or plurality of the cell stacks 120A, 120B, 120C, and 120D may be referred to as the cell stacks 120. Each of the cell stacks 120 is configured as a battery aggregate in which the multiple single cells 121 are electrically connected to each other.

The multiple single cells 121 configuring each cell stack 120 are affixed by support portions 42, which are plate members, on both end sides of the single cells 121. Each of the plate-shaped support portions 42 is provided with through holes into which the respective single cells 121 to be affixed penetrate. Each support portion 42 is integrally formed with the inner case by fixing ends of the support portion 42 to a wall portion forming the inner case. Therefore, the multiple single cells 121 are integrally affixed to the inner case through the two support portions 42 on both end sides of the single cells 121. The multiple single cells 121 are installed so that the longitudinal direction or the axial direction of the multiple single cells 121 is along the vertical direction, that is, along the direction in which the fluid flows down in the downstream side chambers 41 and 43. The fluid flowing around the multiple single cells 121 flows in a direction intersecting with the vertical direction. The passage of the fluid when passing around the multiple single cells 121 is also called a battery path.

The battery pack 1 includes a first air blowing device 140A for drawing the fluid through the inside of the inner cases 4 and a second air blowing device 140B for drawing the fluid through the interior of the inner cases 4 and the inner case 104. Hereinafter, the two air blowing devices 140A and 140B may be collectively referred to as air blowing devices 140. In the battery pack 1, a fluid such as air, various gases, water, or refrigerant can be used as the fluid forming the circulation flow.

The first air blowing device 140A and the second air blowing device 140B each include a motor 141, a sirocco fan 142, and a fan casing 143. The motor 141 is an electric device that rotationally drives the sirocco fan 142. The sirocco fan 142 is a centrifugal fan that draws the fluid in a direction of a rotation axis and blows out the fluid in a centrifugal direction. The sirocco fan 14 is installed so that a rotation axis of the sirocco fan 14 is directed in the vertical direction.

The fan casing 143 is formed so as to cover the sirocco fan 142, and serves as a wind guide member for setting a direction of drawing and blowing out the fluid with the sirocco fan 142. The fan casing 143 has a suction port 143a as a suction portion opening on an upper side of the sirocco fan 142. The fan casing 143 is connected with a blowing duct 143b for guiding the blown fluid to the inside of the pack case 110, and a blowing duct 143b for guiding the fluid in the downstream side chambers 41 and 43 to the suction port 143a through the lower wall side passage 135. A blowout port 143c opened at a tip portion of the blowing duct 143b is connected to a connection port provided in a wall of the pack case 110, for example, the lower wall 112 so as to face the inside of the pack case 110. The blowing duct 143b of the first air blowing device 140A is connected to a portion of the lower wall 112 in the vicinity of the side wall 114. The blowing duct 143b of the second air blowing device 140B is connected to a portion of the lower wall 112 in the vicinity of the side wall 113.

The suction port 143a of the first air blowing device 140A is connected to the lower wall side passage 135 located below the cell stack 120C in the inner case 4, and the lower wall side passage 135 located below the cell stack 120D, through a drawing duct 144. A tip opening of the drawing duct 144 is connected to a connection port provided in the lower wall 112 so as to face each lower wall side passage 135. The suction port 143a of the second air blowing device 140B is connected to three lower wall side passages 135 through a drawing duct 145. The three lower wall side passages 135 include a passage below the cell stack 120C in the inner case 4, a passage below the cell stack 120D, and a passage below the cell stack 120C in the inner case 104. A tip opening of the drawing duct 145 is connected to a connection port provided in the lower wall 112 so as to face each lower wall side passage 135.

The first air blowing device 140A is a fluid drive device that draws air, which has cooled the cell stacks 120A to 120D in the inner cases 4 and merged into the downstream side chambers 41, from the suction port 143a. The second air blowing device 140B is a fluid drive device that draws air, which has cooled the respective cell stacks 120 in the inner cases 4 and merged in the downstream side chamber 41, and air, which has cooled the respective cell stacks 120 in the inner case 104 and merged in the downstream side chamber 43, from the suction port 143a. The downstream side chamber 43 is connected to the lower wall side passage 135 partitioned between the beam 3 and the beam 3.

The first air blowing device 140A circulates a cooling fluid in a first circulation path passing through an inner passage of the blowing duct 143b, the interior of the pack case 110, the respective individual storage chambers 40 in the inner case 4, the downstream side chamber 41, the lower wall side passage 135, and the inner passage of the drawing duct 144. The second air blowing device 140B circulates a cooling fluid in a second circulation path passing through an inner passage of the blowing duct 143b, the interior of the pack case 110, the respective individual storage chambers 40 in the inner cases 4 and 104, the downstream side chambers 41 and 43, the lower wall side passage 135, and the inner passage of the drawing duct 145. In other words, one of the second circulation paths is a passage that passes through the inner passage of the blowing duct 143b, a space between the pack case 110 and the inner case 4, the respective individual storage chambers 40 in the inner case 4, the downstream side chamber 41, the lower wall side passage 135, and the inner passage of the drawing duct 145. The other second circulation path is a passage that passes through the inner passage of the blowing duct 143b, a space between the pack case 110 and the inner case 104, the respective individual storage chambers 40 in the inner case 104, the downstream side chamber 43, the lower wall side passage 135, and the inner passage of the drawing duct 145.

The pack case 110 has a box shape formed of multiple walls surrounding its inner space and is formed of a molded product formed of an aluminum plate or an iron plate. The pack case 110 is, for example, a flat rectangular parallelepiped in the vertical direction, and has six surfaces including, for example, the upper wall 111, the lower wall 112, and two sets of side walls opposed to each other. The upper wall 111 is a wall forming an upper surface of the pack case 110, which is a rectangular wall having long sides in a front-rear direction. The lower wall 112 is a wall that forms a lower surface of the pack case 110 and has the same shape as that of the upper wall 111.

The side walls 113 and the side walls 114 are walls that form right and left surfaces of the pack case 110, which are elongated rectangular walls having long sides in the front-rear direction. The side walls 113 and the side walls 114 are in a positional relationship to face each other. The four side walls are provided so as to be orthogonal to the upper wall 111 and the lower wall 112. The respective side walls 113 and side walls 114 are provided with multiple refrigerant passages 113a and multiple refrigerant passages 114a through which the refrigerant flows. The refrigerant is allowed to flow through those refrigerant passages, thereby being capable of cooling the side walls 113 and the side walls 114, and heat radiation of the case can be promoted through those side walls.

Instead of assembling the respective walls, the pack case 110 may be manufactured by assembling multiple case bodies together so as to provide a space inside the pack case 110. Multiple recessed portions or projected portions may be provided on the surface of a predetermined wall among the multiple walls forming the pack case 110 in order to increase a heat radiation area.

For example, a battery management unit may be housed inside the pack case 110. The battery management unit is configured so as to communicate with various electronic control devices mounted in the vehicle. The battery management unit is a device that manages at least the amount of electricity stored in the single cells 121, which is an example of a battery control unit that controls the single cells 121. Further, the battery management unit may be a device that monitors current, voltage, temperature, and the like relating to the single cells 121, and also manages an abnormal state, leakage and the like of the single cells 121. Similarly to the vehicle ECU, the battery management unit includes an input circuit, a microcomputer, an output circuit, and the like. Battery information is accumulated in a storage device of the microcomputer as data as needed. The stored battery information data is, for example, a battery voltage, a charging current, a discharging current, and a battery temperature in the battery pack 1.

The battery management unit also functions as a control device that controls the operation of the first air blowing device 140A and the second air blowing device 140B. The battery management unit receives temperature information detected with a temperature detector for detecting the temperature of a predetermined single cell 121. Each of the temperature detectors can be configured with a temperature detection line, a temperature sensor or the like which outputs a signal to the battery management unit. The battery management unit controls operations of the first air blowing device 140A and the second air blowing device 140B when conditions for implementing battery cooling is satisfied according to the battery temperature detected with each temperature detector.

The beams 3 are components formed separately from the pack case 110, which are, for example, members having a rectangular or trapezoidal cross section. For example, the beams 3 each have a U-shaped cross section or a C-shaped cross section, and are affixed to the lower wall 112 so that the opening portion faces downward. The inner cases 4 and the inner case 104 that house the cell stacks 120 are placed on the upper surface of the beams 3. The beams 3 are made of, for example, an aluminum material, an iron material, or the like.

The beams 3 are each integrated with the lower wall 112 and the inner cases 4 in a state of being sandwiched between the lower wall 112 and the inner cases 4 on the side of the side wall 114 or the inner cases 4 on the side of the side wall 113, to thereby increase the strength of the pack case 110 and the inner case 4. In addition, the beams 3 are each integrated with the lower wall 112 and the inner case 104 in a state of being sandwiched between the lower wall 112 and the inner case 104, to thereby increase the strength of the pack case 110 and the inner case 104.

An upper wall side passage 133 is a space between the pack case 110 and the inner case 104, which is a passage that is orthogonal to each side wall and extends in parallel to the upper wall 111 and is provided between the inner cases 4 and the upper wall 111. A side wall side passage 132 is a space between the pack case 110 and the inner case 104, which is a passage that is orthogonal to both of the upper wall 111 and the lower wall 112, extends in parallel to the side wall 114, and provided between the inner cases 4 and the side wall 114. A side wall side passage 131 is a space between the pack case 110 and the inner cases 4, which is a passage that is orthogonal to both of the upper wall 111 and the lower wall 112, extends in parallel to the side wall 113, and provided between the inner cases 4 and the side wall 113.

The side wall side passage 132 and the upper wall side passage 133 are connected to each other inside a boundary portion between the upper wall 111 and the side wall 114. The side wall side passage 131 and the upper wall side passage 133 are connected to each other inside a boundary portion between the upper wall 111 and the side wall 113. Therefore, the upper wall side passage 133 is a passage connected to both of the side wall side passage 131 and the side wall side passage 132. The upper wall side passage 133 provides a mixing space in which the air flowing through the side wall side passage 132 and the air flowing through the side wall side passage 131 can be mixed with each other.

Subsequently, a circulation flow formed by the fluids supplied by the first air blowing device 140A and the second air blowing device 140B in the battery pack 1 will be described. Each of the single cells 121 self-heats at an output time when the current is taken out and at an input time to be charged. The battery management unit constantly monitors the temperature of a predetermined single cell 121 with the temperature detector, and controls the operation of the first air blowing device 140A and the second air blowing device 140B based on the detected temperature of the single cell 121. The battery management unit applies respective voltages controlled to duty ratios of arbitrary values falling within 0% to 100% of a maximum voltage to the first air blowing device 140A and the second air blowing device 140B according to the temperature of the single cell 121A to make the rotational speed of the sirocco fan 142 variable.

When the first air blowing device 140A is operated, the air circulates through the first circulation path. At this time, the air present inside the pack case 110 and outside the inner cases 4 is suctioned into the respective individual storage chambers 40 from the respective inlet ports 40a provided in the inner cases 4. The air flowing into each of the individual storage chambers 40 cools the multiple single cells 121 configuring the respective cell stacks 120A to 120D, and thereafter flows out from the respective outlet ports 40b to the downstream side chambers 41. Because each of the downstream side chambers 41 becomes a negative pressure space relative to the outside of the inner cases 4, the air merged in the downstream side chambers 41 is drawn into the first air blowing device 140A from the downstream side chambers 41 through the lower wall side passages 135 and the inner passage of the drawing duct 144. At this time, the air flowing through the lower wall side passage 135 radiates heat to the outside through the lower wall 112.

The air drawn into the first air blowing device 140A is supplied to the side wall side passage 132 and the upper wall side passage 133 through the inner passage of the blowing duct 143b. As a result, the pressure outside the inner cases 4 become a positive pressure relative to the pressure in the downstream side chambers 41 on which a suction force of the first air blowing device 140A acts. For that reason, the air supplied to the outside of the inner cases 4 can be introduced into the individual storage chambers 40 from all of the inlet ports 40a. Since the air flowing through the side wall side passage 132 and the upper wall side passage 133 radiates heat to the outside through the side wall 114 and the upper wall 111, the heat absorbed from the single cells 121 when flowing through the respective individual storage chambers 40 can be discharged to the outside so that the air temperature can be lowered. The air continues to flow through the first circulation path in the above manner, and consequently, the first air blowing device 140A continues to circulate the cooling air to the multiple cell stacks 120 in the inner cases 4 so that even battery cooling can be performed.

When the second air blowing device 140B is operated, the air circulates through the second circulation path. At this time, the air existing inside the pack case 110 and outside the inner cases 4 and the inner case 104 is drawn into the respective individual storage chambers 40 from the respective inlet ports 40a provided in the inner cases 4 and 104. The air flowing into the respective individual storage chambers 40 in the inner cases 4 cools the multiple single cells 121 configuring the respective cell stacks 120A to 120D, and thereafter flows out from the respective outlet ports 40b to the downstream side chambers 41. Further, the air flowing into the respective individual storage chambers 40 in the inner case 104 cools the multiple single cells 121 configuring the respective cell stacks 120A and 120C, and thereafter flows out from the respective outlet ports 40b to the downstream side chamber 43.

Because each of the downstream side chambers 41 and 43 becomes a negative pressure space relative to the outside of the inner cases 4, the air merged in the downstream side chambers 41 is drawn into the second air blowing device 140B from the downstream side chambers 41 and the downstream side chamber 43 through the lower wall side passages 135 and the inner passage of the drawing duct 145. At this time, the air flowing through the lower wall side passage 135 radiates heat to the outside through the lower wall 112.

The air drawn into the second air blowing device 140B is supplied to the side wall side passage 131 and the upper wall side passage 133 through the inner passage of the blowing duct 143b. As a result, the pressure outside the inner cases 4 and 104 become a positive pressure relative to the pressure in the downstream side chambers 41 and the downstream side chamber 43 on which a suction force of the second air blowing device 140B acts. For that reason, the air supplied to the outside of the inner cases 4 and the outside of the inner case 104 can be introduced into the individual storage chambers 40 from all of the inlet ports 40a. Since the air flowing through the side wall side passage 131 and the upper wall side passage 133 radiates heat to the outside through the side wall 113 and the upper wall 111, the heat absorbed from the single cells 121 when flowing through the respective individual storage chambers 40 can be discharged to the outside so that the air temperature can be lowered. The air continues to flow through the second circulation path in the above manner, as a result of which the second air blowing device 140B continues to circulate the cooling air to the multiple cell stacks 120 in the inner cases 4 and the multiple cell stacks 120 in the inner case 104 so that even battery cooling can be performed.

Subsequently, the advantages produced by the battery pack 1 according to the first embodiment will be described below. The battery pack 1 includes the multiple cell stacks 120A to 120D that are battery aggregates each of which connects the multiple tubular single cells 121 to each other, the inner cases 4, and the pack case 110 that houses the inner cases 4. Each of the inner cases 4 is integrated with the support portions 42 for fixing the single cells 121, and includes the multiple individual storage chambers 40 each storing the respective cell stacks, individually. The battery pack 1 includes the air blowing devices 140 that draw the fluid supplied into the pack case 110 after having passed through the individual storage chambers 40 to form the circulation flow inside the pack case 110. The battery pack 1 includes the multiple beams 3 that are integrally provided on the lower wall 112 of the pack case 110 and support the inner cases from the lower side. In the inner cases 4, each of the multiple individual storage chambers 40 includes the inlet port 40a into which the fluid flows from the outside of the inner case 4 and the outlet port 40b through which the fluid flows out from the individual storage chamber 40. The downstream side chamber 41 that communicates with the respective outlet ports 40b is provided in the interior of each inner case 4 between the individual storage chambers 40 that face each other through a space. The downstream side chamber 41 is connected to the lower wall side passages 135 partitioned by the beams 3. The fluid flowing out from the outlet ports 40b to the downstream side chamber 41 passes through the lower wall side passages 135 and is drawn into the suction port 143a of the air blowing devices 140.

According to the battery pack 1, the inner cases 4 are provided inside the pack case 110 configuring an outer shell of the battery pack 1. Each of the inner cases 4 is integrated with the support portions 42 for fixing the single cells 121, and includes the individual storage chambers 40 each storing the respective cell stacks 120, individually. Further, the downstream side chamber 41 that communicates with the respective outlet ports 40b of the individual storage chambers 40 is provided in the interior of each inner case 4 between the individual storage chambers 40 that face each other through the space. Therefore, each inlet port 40a opens to the space around the inner case 4, and each outlet port 40b opens to the downstream side chamber 41. In other words, all of the inlet ports 40a communicate with the downstream chambers 41 through the individual storage chambers 40 and the outlet ports 40b. The downstream side chambers 41 are connected to the lower wall side passages 135 partitioned with the beams 3 that support the inner cases 4 from the lower side. The fluid flowing out to the downstream side chambers 41 passes through the lower wall side passages 135 and is drawn into the suction ports 143a of the air blowing devices 140.

With such a configuration, each of the downstream side chambers 41 can be put into a negative pressure space that is in a negative pressure relative to the pressure inside the pack case 110 and outside the inner cases 4. For that reason, the battery pack 1 can draw the fluid blown out from the air blowing device 140 to the outside of the inner cases 4 toward the downstream side chambers 41. According to the above operation, the fluid outside each inner case 4 can pass through the inlet port 40a, the individual storage chamber 40, and the outlet port 40b of each cell stack 120 in the stated order, and the fluid that has passed through all of the cell stacks 120 can be merged in the downstream side chamber 41. Accordingly, with the use of a pressure difference between the outside of the inner cases 4 and the downstream chamber 41, the battery pack 1 forms a circulation path for allowing the fluid outside the inner cases 4 to pass through each of the multiple cell stacks 120. The battery pack 1 enables to equalize the circulation of the cooling fluid to the multiple cell stacks 120 and to reduce the number of ducts connected to the respective cell stacks 120.

Further, according to the battery pack 1, because each of the lower wall side passages 135 connected to the downstream side chambers 41 is partitioned with the beams 3 that support the inner case 4 from the lower side, the employment of the ducts can reduced for the passages leading to the suction ports 143a of the air blowing devices 140.

The single cells 121 included in the battery pack 1 are stored in each of the individual storage chambers 40 in a posture in which a longitudinal direction of the single cells coincides with a direction along which the fluid flows down in the downstream side chamber 41. According to the above configuration, the intake ducts extending in the same direction as the longitudinal direction of the single cells 121 can be reduced in each cell stack 120. In addition, since a flow rate in the downstream side chambers 41 can be increased, a force of drawing the fluid outside the inner cases 4 and the inner case 104 from the respective inlet ports 40a into the individual storage chambers 40 can be increased.

The individual storage chambers 40 are provided in multiple stages inside the inner cases 4. The longitudinal direction of the single cells 121 stored in the individual storage chambers 40 is the same as the direction in which the individual storage chambers 40 are arranged in the multiple stages. According to the above configuration, the downstream side chambers 41 can be set to have a long distance in the downstream direction by leveraging the longitudinal dimension of the single cells 121. As a result, since the flow rate in the downstream chambers 41 can be further increased, the force of drawing the fluid outside the inner cases 4 and the inner case 104 from the respective inlet ports 40a to the individual storage chambers 40 can be further increased.

The multiple inner cases 4 are housed inside the pack case 110. According to the above configuration, the cooling fluid can be evenly distributed to a larger number of cell stacks, and an excellent battery cooling performance can be produced for the battery pack having a large storage capacity.

The battery pack 1 includes the multiple beams 3 that are integrally provided on the lower wall 112 of the pack case 110 and support the cell stacks 120 from the lower side. Each lower wall side passage 135 is a passage surrounded by at least the beams 3, 4, the lower wall 112, and the lower end of the inner case 4. According to the above configuration, since the multiple beams 3 are provided on the lower wall 112, each beam 3 serves as a reinforcing member, and the strength of the pack case 110 can be improved. Since the cell stack 120 is installed on the respective beams 3, even if an impact is applied from the outside of the pack case 110, the impact can be received by each beam 3, and the single cells can be protected from the impact.

Further, each lower wall side passage 135 is partitioned with the use of the walls forming the reinforcing beams 3 and the lower wall 112. For that reason, the beam member for reinforcement can be leveraged for forming the passage, the number of members can be reduced, and the cost can be reduced by leveraging the beams in a simple shape. Therefore, the lower wall side passages 135 can be configured without installing a separate duct inside the pack case 110. Further, since each beam 3 is used as a member for forming a part of the lower wall side passage 135, a size of the battery pack 1 can be prevented from increasing as compared with the case where the beams are provided merely to reinforce the pack case 110.

Second Embodiment

Figure 2:
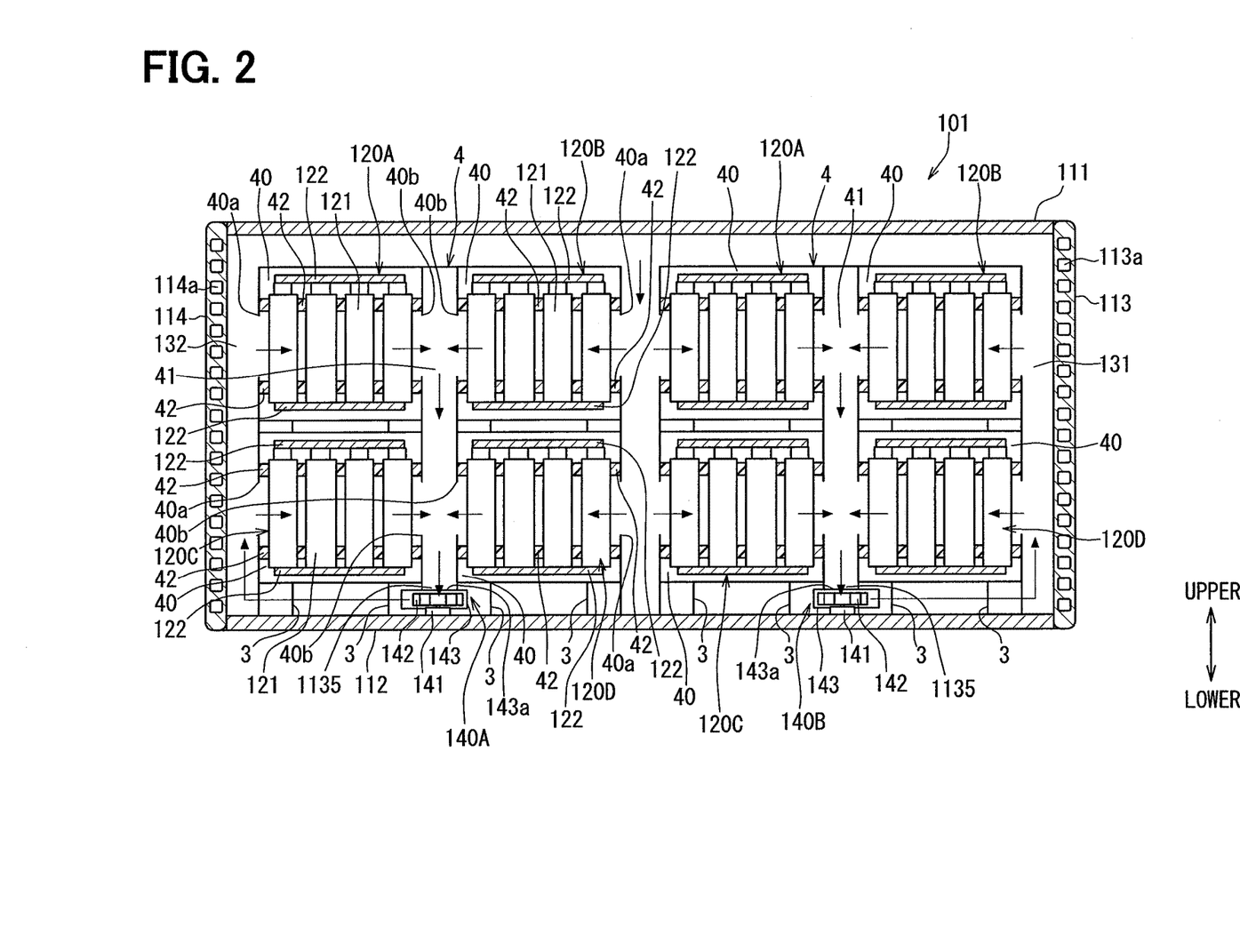
FIG. 2 is a plan view showing a configuration and a fluid flow of a battery pack according to a second embodiment.

In a second embodiment, a battery pack 101 that has a different configuration than that of the battery pack 1 in the first embodiment will be described with reference to FIG. 2. In FIG. 2, components denoted by the same reference numerals as those in the drawings of the first embodiment are the same components, and have the same advantages. Hereinafter, differences from the first embodiment will be described.

The battery pack 101 is different from the battery pack 1 in that two first air blowing devices 140A and second air blowing device 140B are housed in a pack case 110. The battery pack 101 has a different fluid flow path associated with a difference in configuration.

As shown in FIG. 2, the first blowing device 140A is capable of drawing air merged from respective individual storage chambers 40 in downstream side chambers 41 into lower wall side passages 1135 provided between a beam 3 and a beam 3. The air drawn into the first air blowing device 140A is supplied to a side wall side passage 132 and an upper wall side passage 133 through a space between inner cases 4 and a lower wall 112. Since the air flowing through the side wall side passage 132 and the upper wall side passage 133 radiates heat to the outside through a side wall 114 and an upper wall 111, the heat absorbed from all of single cells 121 when flowing through the respective individual storage chambers 40 can be discharged to the outside so that the air temperature can be lowered.

Likewise, the second blowing device 140B is capable of drawing the air merged from the respective individual storage chambers 40 in the downstream side chambers 41 into the lower wall side passages 1135 provided between the beam 3 and the beam 3. The air drawn into the second air blowing device 140B is supplied to a side wall side passage 131 and the upper wall side passage 133 through a space between the inner cases 4 and the lower wall 112. Since the air flowing through the side wall side passage 131 and the upper wall side passage 133 radiates heat to the outside through a side wall 113 and the upper wall 111, the heat absorbed from all of the single cells 121 when flowing through the respective individual storage chambers 40 can be radiated to the outside so that the air temperature can be lowered.

Other Embodiments

The disclosure of the present specification is not limited to the illustrated embodiments. The disclosure encompasses the illustrated embodiments and modifications by those skilled in the art based on the illustrated embodiments. For example, the disclosure is not limited to the combination of parts and elements shown in the embodiments, and various modifications can be carried out. The disclosure can be embodied in various combinations. The disclosure may have additional parts that may be added to the embodiments. The disclosure encompasses an embodiment in which parts and elements of the embodiment are omitted. The disclosure encompasses the replacement or combination of parts and elements between one embodiment and another embodiment. The disclosed technical scope is not limited to the description of the embodiments.

The number of cell stacks included in the battery pack is not limited to the number described in the above embodiments. The number of inner cases included in the battery pack is not limited to the number described in the above embodiments.

In the embodiments described above, the pack case 110 forms a hexahedron or a rectangular parallelepiped, but the case included in the embodiments of the present specification is not limited to this shape. For example, the pack case 110 may be a polyhedron exceeding six planes, or at least one surface may include a curved surface. Further, in the pack case 110, the upper wall may be formed into a dome shape including a curved surface, or a vertical sectional shape of the case may have a trapezoidal shape. Further, in the pack case 110, the upper wall is a wall in a positional relationship opposed to the lower wall, and a shape of the upper wall may include any of planar and curved shapes. Further, in the pack case 110, the side wall may be a wall extending from the lower wall in a direction intersecting with the lower wall, or may be a wall extending from the upper wall in a direction intersecting with the upper wall. A boundary portion between the upper wall and each side wall of the pack case 110 may form a corner portion or a curved surface. A boundary portion between the lower wall and each side wall of the pack case 110 may form a corner portion or a curved surface.

In addition to the sirocco fans, axial flow type fans, turbo fans, and the like can be used for the fans of the respective air blowing devices included in the battery packs 1 and 101.

The multiple embodiments disclosed in the present specification adopt different technical measures from each other in order to achieve the respective objects. One of the disclosed battery packs includes the multiple cell stacks 120A, 120B, 120C, and 120D, the inner cases 4, the fluid drive devices 140 A and 140 B, and the multiple beams 3. Each of the multiple cell stacks 120A, 120B, 120C, and 120D is a battery assembly in which the multiple tubular single cells 121 are connected to each other. Each of the inner cases 4 is integrated with the support portions 42 for fixing the single cells, and includes the multiple individual storage chambers 40 each storing the respective cell stacks, individually. The fluid drive devices 140A and 140B draw the fluid supplied to the pack case 110 that houses the inner cases, and the inside of the pack case after passing through the individual storage chambers in the inner cases, and form a circulation flow inside the pack case. The multiple beams 3 are integrally provided on the lower wall 112 of the pack case 110 and support the inner cases from the lower side.

In the inner cases, each of the multiple individual storage chambers includes the inlet port 40a into which the fluid flows from the outside of the inner case and the outlet port 40b through which the fluid flows out from the individual storage chamber. The downstream side chamber 41 that communicates with the respective outlet ports is provided in the interior of each inner case between the individual storage chambers that face each other through a space. The downstream side chamber is connected to the lower wall side passages 135 partitioned by the beams. The fluid flowing out from the respective outlet ports to the downstream side chamber passes through the lower wall side passage and is drawn into the suction port 143a of the fluid drive device.

According to the disclosed battery pack, the inner cases are provided inside the pack case configuring the outer shell of the battery pack, and the inner case is integrally provided with the support portions for fixing the single cells, and includes the individual storage chambers that store the respective cell stacks individually. Further, the downstream side chamber 41 that communicates with the respective outlet ports of the individual storage chambers is provided in the interior of each inner case between the individual storage chambers that face each other through a space. The downstream side chambers are connected to the lower wall side passages 135 partitioned with the beam that supports the inner cases from the lower side, and the fluid flowing out to the downstream side chambers passes through the lower wall side passage and is drawn into the intake ports of the fluid drive devices. With such a configuration, each of the downstream side chambers can be put into a space that is a negative pressure relative to the pressure inside the pack case and outside the inner cases. For that reason, since the battery pack draws the fluid supplied from the fluid drive device to the outside of the inner cases toward the downstream side chambers, the fluid outside the inner cases can pass through the inlet ports, the individual storage chambers, and the outlet ports of the respective cell stacks, and is merged in the downstream side chambers. Accordingly, with the use of a pressure difference between the outside of the inner cases and the downstream side chamber, the battery pack enables the fluid outside the inner cases to pass through each of the multiple cell stacks. With the above description, the battery pack can equalize the circulation of the cooling fluid to the multiple cell stacks and reduce the number of ducts connected to the respective cell stacks.

The present disclosure has been described with reference to the examples, but the present disclosure is not limited to the examples or the structures. The present disclosure includes various modification examples and modifications within the same range. In addition, it should be understood that various combinations or aspects, or other combinations or aspects, in which only one element, one or more elements, or one or less elements is included to the various combinations or aspects, are included in the scope or the technical idea of the present disclosure.

The invention claimed is:

1. A battery pack comprising:
  a plurality of cell stacks that are battery aggregates formed by connecting a plurality of tubular single cells to each other;
  an inner case integrated with a support portion fixing the single cells, the inner case having a plurality of individual storage chambers storing the respective cell stacks, individually;
  a pack case that houses the inner case;
  a fluid drive device to draw a fluid supplied to an interior of the pack case after the fluid has passed through the individual storage chambers of the inner case, the fluid drive device forming a circulation flow inside the pack case; and
  a plurality of beams integrated with a lower wall of the pack case to support the inner case from a lower side, wherein
  each of the individual storage chambers in the inner case includes an inlet port into which the fluid flows from the outside of the inner case, and an outlet port through which the fluid flows out of the individual storage chamber,
  an interior of the inner case forms a downstream chamber, which communicates with each of the outlet ports, between the individual storage chambers facing each other at a distance,
  the downstream side chamber is connected to a lower wall side passage partitioned with the beams, and
  the fluid flowing out of each of the outlet ports into the downstream side chamber passes through the lower wall side passage and is drawn into an intake port of the fluid drive device.

2. The battery pack according to claim 1, wherein the single cells are stored in each of the individual storage chambers in a posture in which a longitudinal direction of the single cells coincides with a direction along which the fluid flows down in the downstream side chamber.

3. The battery pack according to claim 2, wherein the individual storage chambers are provided inside the inner case at a plurality of stages, and the longitudinal direction of the single cells stored in the individual storage chambers coincides with a direction along which the plurality of stages of the individual storage chambers are placed on each other.

4. The battery pack according to claim 1, wherein a plurality of the inner cases are housed inside the pack case.

\* \* \* \* \*